(12) United States Patent
Fehlner

(10) Patent No.: US 6,216,491 B1
(45) Date of Patent: Apr. 17, 2001

(54) LCD PANEL PRODUCTION

(75) Inventor: Francis P. Fehlner, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 08/132,554

(22) Filed: Oct. 5, 1993

Related U.S. Application Data

(63) Continuation-in-part of application No. 07/853,587, filed on Mar. 18, 1992, now abandoned.

(51) Int. Cl.$^7$ .................................................. C03C 17/23
(52) U.S. Cl. ........................... 65/25.3; 65/60.5; 65/60.53; 65/60.8; 65/90; 427/165
(58) Field of Search .................. 65/60.5, 60.53, 65/60.8, 24, 25.3, 60.1, 90, 99.1, 169, 193; 427/165, 166, 167, 457, 537, 126.2, 255, 397.7; 428/1, 409, 410, 428, 429, 688

(56) References Cited

U.S. PATENT DOCUMENTS

| | | | |
|---|---|---|---|
| 3,149,949 | 9/1964 | Dockerty et al. | 65/53 |
| 3,208,839 | 9/1965 | Nordberg | 65/24 |
| 3,338,696 | 8/1967 | Dockerty | 65/145 |
| 3,682,609 | 8/1972 | Dockerty | 65/83 |
| 3,938,242 | * 2/1976 | Sussman | 427/126.2 |
| 4,153,518 | * 5/1979 | Holmes et al. | 427/126.2 |
| 4,180,618 | * 12/1979 | Alpha et al. | 428/428 |
| 4,188,444 | * 2/1980 | Landau | 428/429 |
| 4,485,146 | 11/1984 | Mizuhashi et al. | 428/428 |
| 4,828,880 | 5/1989 | Jenkins et al. | 427/167 |
| 4,995,893 | 2/1991 | Jenkins et al. | 65/18.2 |
| 5,073,181 | 12/1991 | Foster et al. | 65/24 |
| 5,165,972 | * 11/1992 | Porter | 428/429 |

FOREIGN PATENT DOCUMENTS

| | | |
|---|---|---|
| 2 144 733 | 3/1985 | (GB) . |
| 2 163 146 | 2/1986 | (GB) . |

OTHER PUBLICATIONS

An article in IEEE Electron Device Letters, vol. EDL–7, No. 11, Nov, 1986 by J. R. Troxell et al., "Polycrystalline Silicon Thin–Film Transistors on a Novel 800°$^C$Glass Substrate".

* cited by examiner

*Primary Examiner*—James Derrington
(74) *Attorney, Agent, or Firm*—Milton M. Peterson

(57) ABSTRACT

A method of producing a glass panel for a LCD device. The method comprises depositing on at least one surface of the panel a transparent film from an atmosphere of an atomized, or ionized, inert, refractory material, or reactive precursor, the film being 50–500 nm thick. The panel is subjected to a heat treatment to compact the glass, the deposited film preventing glass adherence during the compacting heat treatment.

14 Claims, 1 Drawing Sheet

LCD PANEL PRODUCTION

This application is filed as a continuation-in-part of Ser. No. 07/853,587 filed Mar. 18, 1992 and abandoned.

FIELD OF THE INVENTION

The field of the invention is production of glass panels for use in assembly of a liquid crystal display (LCD) device.

BACKGROUND OF THE INVENTION

Liquid crystal display devices, whether passive or active, customarily embody thin, parallel, spaced glass panels with an intermediate liquid crystal layer.

Initially, soda lime glass panels were used in producing passive LCD devices. It was observed that, when such panels were employed, degradation of the liquid crystal occurred at normal operating temperatures. This was due to sodium ion migration to the glass surface, and an exchange of sodium for hydrogen ions in water contaminating the liquid crystal. To avoid this, it has been proposed to apply a silica film to the surface of the glass panel. This film acts as a barrier layer to stop sodium ion migration from the glass, and thus prevent exposure of the liquid crystal layer to the sodium ions.

Another approach to controlling sodium has been to use a $BaO-Al_2O_3-B_2O_3-SiO_2$ glass available from Corning Incorporated as Code 7059. This glass is nominally free of alkali metal oxides. This means that the glass has no intentionally added alkali metal compound in its batch, but may contain up to about 0.1% $Na^+$ as an impurity. Use of this glass avoids contamination of the liquid crystal.

In the active device, the back panel, or active plane, has thin film transistors formed on the glass by photolithographic steps, together with attached circuitry. The front panel, or color plane, has transparent colored dots or stripes in the case of a full color display. Combined with the inverted design of thin film transistors, Code 7059 glass also provides sufficient protection for the active elements in an active matrix LCD device while the amorphous silicon transistors are being fabricated on the glass at temperatures under 400° C. Sodium contamination would lead to transistor instability over time.

However, use of polysilicon thin film transistors is becoming increasing popular for active matrix LCDs. This practice involves processing temperatures that are substantially higher than the temperatures required for the amorphous silicon, and that approach the strain point of the glass. At these temperatures, sodium, which is present as an impurity, begins to create a problem again. As a result, it again becomes necessary to provide a barrier layer on the glass panel to prevent migration.

Fabrication of the active plane, or active matrix, involves the use of multiple photolithographic steps which require precise alignment. This requires that the panels not only have precise dimensions as formed, but that such precise dimensions be retained during subsequent processing steps. However, these processing steps may involve thermal exposure at or near temperatures where a glass may undergo structural rearrangement and/or dimensional relaxation. Accordingly, it has become common practice to subject glass panels to a compaction process after formation and before further thermal processing.

Compaction involves reheating a glass body to a temperature below the glass softening point, but equal to or above the maximum temperature reached in a subsequent processing step. This achieves structural rearrangement and dimensional relaxation in the glass prior to, rather than during, the subsequent processing. Preliminary compaction is imperative where it is necessary to maintain precise alignment and/or flatness in a glass body during subsequent photolithographic processing, as in the manufacture of flat panel display devices.

It is economically attractive to compact glass sheets in stacks. However, this necessitates interleaving, or separating, adjacent sheets with a release material to avoid sticking. At the same time, it is necessary to maintain the sheets extremely flat, and with an optical-quality surface finish.

The panels used in an LCD device must, of course, be of optical quality. Strict cleanliness is a requirement during all processing. Any marring of the surface, such as surface scratches, indentations, or the like, must be avoided.

Currently, sheets of graphite are inserted between glass panels to serve as a parting agent during the compaction process. They must be removed at completion of the process. This is not only an added step, but on occasion leads to scratches that must be removed by polishing.

It has been proposed in U.S. Pat. No. 5,073,181 (Foster et al.) to substitute a monolayer of submicron silica particles as a parting layer. However, this is also a non-permanent layer that must be removed before further processing. Hence, it could not function as a barrier layer to sodium migration.

It would, therefore, be desirable to apply a permanent surface film on at least one side of a glass panel during formation of the panel, or prior to further processing. This film would have to remain on the panel and not interfere with processing or operation of an LCD display, either passive or active. The film should be inert, transparent and refractory. It should serve as a parting agent to prevent glass adhesion during compaction, and also as a barrier layer to prevent sodium migration which would result in liquid crystal, or thin film transistor, degradation. Finally, it should improve the scratch resistance of the surface. It is a basic purpose of the present invention to provide a method of producing a glass panel for an LCD device that has such features.

SUMMARY OF THE INVENTION

My invention resides in a method of producing a glass panel for a LCD device wherein the glass is nominally alkali-free, that is, may have an alkali metal content no greater than about 0.1% by weight, and wherein the method comprises depositing on at least one surface of a clean panel a continuous, permanent, transparent, barrier layer film from an atmosphere of an atomized, or ionized, inert refractory material, or reactive precursor, the film being greater than 50 nm, but not over 500 nm, in thickness, and, after depositing the transparent film on the clean glass panel, stacking a plurality of the clean glass panels to form a stack of adjacent panels, the total film thickness between each pair of adjacent panels in the stack being greater than loonm and subjecting the stack to a heat treatment to compact the glass, the permanent, barrier layer film on the clean glass panel functioning both as a barrier to sodium ion migration and as a parting agent during the compacting heat treatment.

The invention further resides in a method of compacting a plurality of clean glass panels in a stack wherein the glass is nominally alkali-free, that is, may have an alkali metal content no greater than about 0.1% by weight, and wherein a surface on each glass panel opposes a surface on an adjacent glass panel, the method comprising depositing on at least one surface of each glass panel a continuous, permanent, transparent, barrier layer film from an atmosphere of an atomized, or ionized, inert refractory material, or reactive precursor, the film being greater than 50 nm, but not over 500 nm, in thickness, stacking the filmed panels so that at least one of each pair of adjacent surfaces has a film, and the total film thickness between each pair of adjacent surfaces is greater than 100 nm and subjecting the stack to a compaction thermal cycle, the permanent barrier layer film on the clean glass panel functioning both as a barrier to sodium ion migration and as a parting agent during the compaction thermal cycle.

In preferred embodiments, the inert refractory material deposited is silica, the film is deposited by chemical vapor deposition, preferably while the glass panel is being drawn, and the film is deposited on both sides of the panel.

PRIOR ART

In addition to the art previously mentioned, attention is directed to the following patent literature:

U.S. Pat. No. 4,485,146 (Mizuhashi et al.) discloses a soda-lime glass substrate that contains 10 to 20% of an alkali component in its composition. The patent teaches that the known silica layer is not usually sufficient as a barrier layer. In lieu thereof, the patent teaches a silica layer in which hydrogen is bonded to silicon in an amount up to 25 molar %.

U.K. Application No. 2,144,733A (Kawahara et al.) teaches a silica barrier layer film to prevent sodium migration. A glass sheet is dipped in an aqueous solution of $H_2SiF_6$ that is saturated with silica and has boric acid added. A thin preliminary layer of silica can be applied by vacuum deposition or sputtering.

U.K. Application No. 2,163,146A (Porter) teaches producing a barrier layer of silica up to 50 nm thick by pyrolyzing a silane gas on a glass surface at a temperature above 600° C. in the presence of a gaseous electron donating compound.

U.S. Pat. Nos. 4,828,880 and 4,995,893 (Jenkins et al.) teach a modification of the Porter method wherein a gaseous mixture of a silane, an unsaturated hydrocarbon and carbon dioxide is pyrolyzed on a glass surface at a temperature of 600–750° C.

U.S. Pat. No. 3,208,839 (Nordberg) teaches a method of reshaping a glass body wherein adherence of the glass to the reshaping means is prevented by applying a thin, continuous, uniform film of colloidal, refractory metal oxide to the glass and baking to resist mechanical removal. The patent is not concerned with alkali migration and hence provides no disclosure relevant thereto.

An article in IEEE ELECTRON DEVICE LETTERS, Vol. EDL-7, No. 11, November, 1986 by J. R. Troxell et al. describes a new technology for forming polycrystalline silicon thin-film transistors on a nominally alkali-free alkaline earth aluminosilicate glass. The glass was one disclosed in U.S. Pat. No. 4,180,618 (Alpha et al.). A silicon nitride barrier layer film was applied to the glass, with a silica buffer layer being subsequently applied to maintain electrical isolation between transistor devices.

Figure 1:
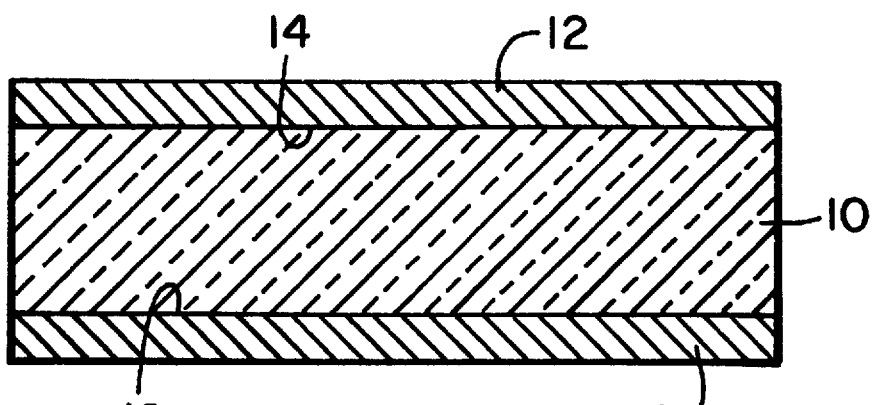
FIG. 1 of the attached drawing is a side elevational view of an individual glass panel 10 having a deposited film 12 applied over both upper surface 14 and lower surface 16. It will be understood that panel 10 could as well have film 12 deposited on only one surface if the film is of sufficient thickness. A panel coated on both surfaces is generally preferred.
Figure 2:
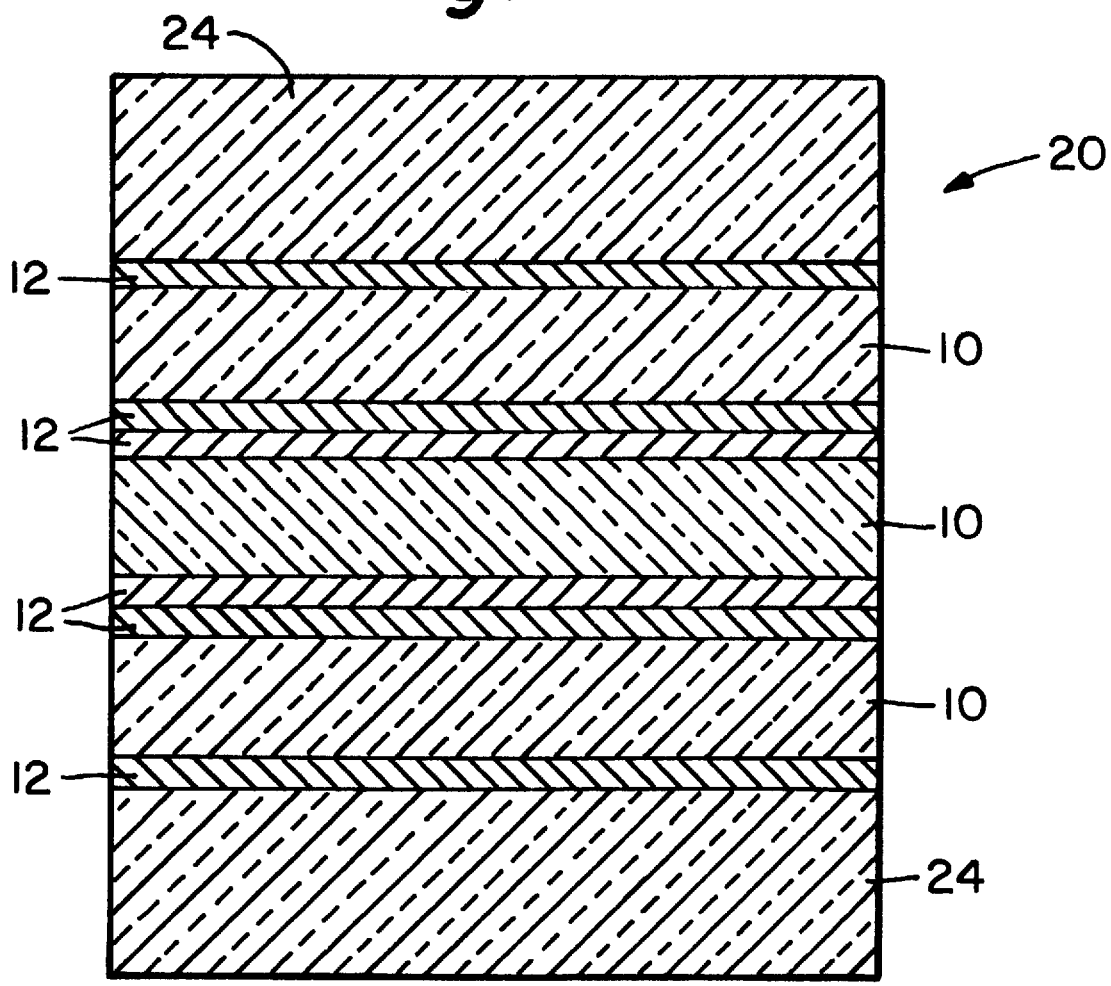
FIG. 2 is a side elevational view of a stack 20 which is composed of three glass panels 10 stacked between two high-temperature stacking pads 24. Glass panels 10 are coated on both sides, as shown in FIG. 1.

If single-side coated panels are used, care must be taken in stacking to insure that a film 12 is present at each interface. The third panel, either bottom or top, must have a film on both surfaces to avoid sticking to the stacking pad 24. Alternatively, it would be necessary to provide a film on the stacking pad, or make the stacking pad from a refractory material such as fused silica.

DESCRIPTION OF THE INVENTION

The term "nominally free of alkali metal oxides", as used herein, means a glass that has no intentionally added alkali metal compound in its batch, but may contain up to about 0.1% $Na^+$ as an impurity. As noted earlier, barrier layer films were employed on soda lime glass panels for LCD devices to minimize sodium ion migration. The advent of nominally alkali-free glasses presumably dispensed with such need.

With the use of higher temperature processing for AMLCD devices, the need for a barrier layer film again arose, even for nominally alkali-free glasses. The present invention addresses that need.

I have now found that, under certain conditions, inert, refractory oxide films can perform the dual functions of a barrier layer and a parting agent. Thus, a properly deposited film can initially function as a parting agent to prevent glass sticking in a compaction process. Subsequently, the film further functions as a barrier layer to prevent alkali migration during subsequent production steps and during operation of the LCD.

The film provides its greatest value if applied during drawing of glass panels in sheet form, or immediately thereafter. A continuously drawn sheet may be coated as it leaves the sheet forming member. Alternatively, the continuous sheet may be severed into individual sheets. These may then be suspended and carried through a coating apparatus. In either case, sides of the sheet may be simultaneously coated, or the coating may be applied to only one side if desired Currently, sheets for active matrix LCD use are drawn by a downflow method. In this method, streams of molten glass overflow from a reservoir, flow down the converging sides of a sheet forming member, and join to form a single sheet as they leave the member. The method and apparatus have been fully described in United States Patents. These include U.S. Pat. No. 3,149,949 (Dockerty et al.) and U.S. Pat. Nos. 3,338,696 and 3,682,609 (Dockerty).

By using an immediate coating procedure, there is less tendency for dust, glass chips and similar debris to adhere to the film. To the extent that contamination does occur, it is more easily and safely cleaned. Chemical durability of the film is also important since the film may be exposed to harsh chemical environments in subsequent processing. The film is generally more resistant to attack than the unprotected glass.

A particular benefit is the fact that the film has no detrimental effect in the completed display device. Hence, not only does it offer continuous protection, but there is no need for a removal step. This minimizes handling by eliminating the step of removing sheets or particles of parting agent. It thereby minimizes possible surface scratches. The hard, refractory nature of the film also resists some surface marring that otherwise might inadvertently occur.

The deposited film may be composed of any inert, refractory material or combination of materials. The term "inert" indicates no chemical reaction with the glass during deposition, or in subsequent operations, other than the formation of chemical bonds at a surface, such as 14. It also indicates a general lack of chemical attack by or on materials used in the device, or in its production. The term "refractory" signifies a material that undergoes no appreciable chemical or physical change at the temperatures encountered in the compaction process. This process employs temperatures close to the glass strain point, for example, a temperature of 580° C. for one hour when Code 7059 glass is compacted.

Refractory materials suitable for barrier layer use include silica, alumina, silicon nitride, titania, tantala and tin oxide. The latter three oxides are less desirable because they have high refractive indices. Application of such an oxide on the outer surface of a glass sheet leads to high reflectivity, a condition not desirable in a display device.

Silicon nitride has been proposed as a barrier to sodium migration. However, a silicon nitride film tends to be electrically conductive when ion implanted, whereby current leakage through the film, or between polysilicon transistor devices, can occur. Therefore, a silicon nitride film can not be used alone where electrical isolation is required. Rather, it must be used in conjunction with an electrically insulating film such as silica.

Further, silicon nitride is difficult to deposit by atmospheric pressure chemical vapor deposition (APCVD) during the glass drawing process. Both alumina and silica can be deposited by APCVD. In general, I prefer a silica film both because of ease of deposition and because of its excellent compatibility with thin film transistors.

The film must be deposited from an atmosphere containing atomic sized species, that is individual atoms or ions, rather than particles of larger size. Accordingly, physical vapor deposition, such as sputtering, or electron beam evaporation, or chemical vapor deposition are preferred processes. The latter (CVD) is favored for coating a sheet as it is drawn. Films formed from atomic sized species tend to be more compact, and hence better alkali diffusion barriers. Also, being more dense, they are more resistant to being marred and attacked chemically.

Film thickness may vary from 50 to 500 nm. Thicker films require longer application times, and hence are more expensive to produce. Therefore, I prefer films not over about 100 nm thick.

However, such thin films may have some tendency to stick during compaction unless coated on both sides of the glass so that filmed surfaces face each other in a stack of panels. When the glass is coated as it is being drawn, or is suspended for coating, such double side coating occurs inherently. In any event, the total of the film thicknesses between adjacent glass surfaces must be greater than 100nm to insure against sticking.

Specific Embodiments

An initial survey was made by preparing a stack of glass test pieces, each piece being one inch (2.5 cm) on a side and 1.2 mm thick. The glass employed was Code 7059 glass. In the stack, some uncoated samples were arranged to interface with each other. Others were arranged to interface with four different test pieces, each having a different protective film. All samples were thoroughly cleaned.

The four filmed test pieces were prepared by coating one side as follows:

1. A 60 nm thick titania film was deposited from an atmosphere created by pyrolyzing a mixture of $TiCl_4$ and $O_2$ in a chamber with the glass at a temperature of 320° C.
2. A 100 nm thick alumina film was deposited by electron beam evaporation of alumina with alumina deposition on the glass at 150° C.
3. A 460 nm thick silica film was deposited over the 100 nm alumina film of #2, again by electron beam evaporation.
4. A 400 nm thick tin oxide film was deposited by chemical vapor deposition from an atmosphere of tetramethyl tin and oxygen with the glass at 525° C.

The arrangement of cleaned test pieces in the stack, excluding top and bottom, heat resistant, stacking pads, is shown in TABLE I. Coated test pieces of Samples 1–4 were arranged so that the film coated sides were adjacent to each other.

TABLE I

| | |
|---|---|
| 1. | Uncoated |
| 2. | Uncoated |
| 3. | $SiO_2$ + $Al_2O_3$ films #3 on bottom |
| 4. | $SiO_2$ + $Al_2O_3$ films #3 on top |
| 5. | $Al_2O_3$ film #2 on bottom |
| 6. | $Al_2O_3$ film #2 on top |
| 7. | $TiO_2$ film #1 on bottom |
| 8. | $TiO_2$ film #1 on top |
| 9. | $SnO_2$ film #4 on bottom |
| 10. | $SnO_2$ film #4 on top |
| 11. | Uncoated |
| 12. | Uncoated |

This test stack was subjected to a time-temperature cycle somewhat more severe than the commercial compaction schedule for Code 7059 glass to provide a margin of safety. The schedule was 675° C. for ninety minutes. When the stack was cooled and disassembled, it was found that all uncoated glass interfaces adhered to each other. None of the film interfaces showed any adhesion, except the $TiO_2$-coated one in a limited area.

In a further test, RF magnetron sputtering from a rectangular alumina target was employed. This deposited a 100 nm thick alumina film on each side of 1"×3" (2.5×7.6 cm), Code 7059 glass substrates that were 1.2 mm thick. 1"×1" (2.5 cm×2.5 cm) test pieces were cut and thoroughly cleaned. Uncoated pieces of Code 7059 glass of the same size were cut and thoroughly cleaned. The glass test pieces were arranged in stacks as shown in TABLE II.

TABLE II

| | |
|---|---|
| 1. | Uncoated |
| 2. | Uncoated |
| 3. | Coated both sides |
| 4. | Coated both sides |
| 5. | Uncoated |
| 6. | Uncoated |

The stack were then subjected to simulated compaction cycles. Two temperatures were used, 600°, approximating the recommended one, the other 60° C. higher. Similarly, two pressures of 54 and 1150 g/in$^2$ (g/6.5 cm$^2$), as applied to the top of a stack, were used. Times varied from 1.5 to 3.3 hours.

When the stacks were cooled and disassembled, it was observed that no adhesion occurred at the $Al_2O_3/Al_2O_3$ interfaces. Examination at 50X under an optical microscope revealed no damage to the surfaces. However, all of the uncoated interfaces fused together, some quite extensively. The $Al_2O_3$/glass interfaces showed a slight degree of adhesion. This indicated that a single layer of 100 nm thick $Al_2O_3$ at an interface could not safely be relied on to prevent adhesion.

In a further test, atmospheric pressure chemical vapor deposition (APCVD) of silica from the reaction of silane with oxygen was utilized. Cleaned glass substrates, 25 mm×75 mm×1.2 mm Code 7059, were introduced into a belt furnace where they were heated to 500° C. As the belt passed under the slot coater, the reactants flowed over the hot glass where they mixed and reacted to form a film of silica. Belt speed and reactant flow were adjusted so that a 50 nm thick film was formed on the top side of the glass. The back side of the glass was coated by turning the substrate over and running it through the coating furnace again.

A second set of silica films on Code 7059 glass was prepared by plasma enhanced chemical vapor deposition (PECVD). These films were deposited on one side of the glass to a thickness of approximately 200 nm.

Samples 1"×1 " (2.5 cm×2.5 cm) were cut from the above film coated glass, along with samples of uncoated Code 7059 glass. All the samples were thoroughly cleaned and stacked in Class 1000 cleanroom conditions. The samples were arranged in the stack as shown in TABLE III.

TABLE III

| 1. | Uncoated |
|---|---|
| 2. | Uncoated |
| 3. | PECVD silica on bottom |
| 4. | PECVD silica on top |
| 5. | APCVD silica on both sides |
| 6. | APCVD silica on both sides |
| 7. | Uncoated |
| 8. | Uncoated |

The stack was subjected to a temperature of 652° C. for 2 hours in air with a pressure of 1150 g/in². When the stack had cooled and been disassembled, the following results were found. The APCVD silica films did not adhere together, but they did adhere to the bare Code 7059 glass. The bare Code 7059 glass samples also adhered together.

The PECVD films did not adhere together and also did not adhere to the bare Code 7059 glass. The reason for the sticking of the APCVD silica to bare glass while the PECVD silica did not is taken to be the difference in film thickness. The APCVD film thickness is less than the 100 nm limit pointed out in the example above (TABLE II) while the thickness of the PECVD silica is greater than 100 nm.

The foregoing experiments led to a pilot run on a larger scale. In this run, 320 mm×320 mm×1.1 mm Code 7059 glass panels were provided with 100 nm thick alumina films on both sides of the panel by electron beam evaporation. Two stacks of ten panels each were assembled, after cleaning, and placed between temperature resistant support plates. The stacks were heat treated at 580° C. for one hour in a lehr. The panels in one stack were all coated. Those in the other stack were arranged as shown in TABLE IV.

TABLE IV

| 1. | Uncoated |
|---|---|
| 2. | Uncoated |
| 3. | Coated both sides |
| 4. | Uncoated |
| 5. | Uncoated |
| 6. | Coated both sides |
| 7. | Coated both sides |
| 8. | Coated both sides |
| 9. | Uncoated |
| 10. | Coated both sides |

Each stack was cooled and disassembled. The second stack exhibited no adhesion at the $Al_2O_3/A_2O_3$ interfaces; some adhesion at some $Al_2O_3$/glass interfaces; complete adhesion at uncoated/uncoated interfaces.

In the other stack, adhesion occurred in spite of the coatings. When these panels were separated and examined, two types of defects were observed where adhesion had occurred. One type of defect appeared as a relatively large blob of foreign material on the order of 525×75 microns. The other type was a small particle of about 15 microns diameter embedded in the surface.

It is my belief that the defects observed resulted from erratic or uneven evaporation of the material, and that the results should be disregarded. The results do suggest that electron beam evaporation must be closely monitored if used as a means of depositing a protective film.

It is necessary to employ standard cleanroom conditions. Thus, all particles must be eliminated from the coated glass surfaces to prevent sticking or surface marring. Also, dust must be excluded from the atmosphere of the locale where stack assembly takes place.

The invention has been described with respect to protection of Code 7059 glass sheets. However, it will be readily apparent that the invention is equally applicable to protection of other glasses that are essentially alkali-free, but may contain sodium as an impurity in amounts up to about 0.1% of the glass composition. Examples of such glasses, having particular utility because of their relatively high strain points, are those disclosed in U.S. Pat. Nos. 5, 116,787 and 5,116,789 (Dumbaugh, Jr. et al.).

I claim:

1. A method of producing a glass panel for a LCD device wherein the glass is nominally free of alkali metal oxides, that is, has no intentionally added alkali metal compound in its batch, but contains up to about 0.1% by weight $Na^+$ as an impurity, and wherein the method comprises depositing on at least one surface of a clean glass panel a continuous, permanent, and transparent barrier layer film from an atmosphere of an atomized or ionized inert refractory material, or reactive precursor, the film being greater than 50 nm, but not over 500 nm, in thickness, and, after depositing the transparent film on the clean glass panel, stacking the filmed glass panel with a plurality of the clean, filmed glass panels to form a stack of adjacent panels, the total film thickness between each pair of adjacent panels in the stack being greater than 100 nm and subjecting the stack to a heat treatment to compact the glass, the permanent barrier layer film on the clean glass panel functioning both as a barrier to sodium ion migration from the glass and as a parting agent during the compacting heat treatment.

2. A method in accordance with claim 1 wherein the film is deposited on both the top and bottom surfaces of the panel.

3. A method in accordance with claim 2 wherein the film is deposited in a thickness of not over about 100 nm.

4. A method in accordance with claim 1 wherein the film is deposited on only one surface of the panel and to a thickness greater than 100 nm.

5. A method in accordance with claim 1 wherein the deposited refractory material is selected from the group consisting of silica, alumina, silicon nitride, tantala, titania and tin oxide.

6. A method in accordance with claim 5 wherein the selected refractory material is silica.

7. A method in accordance with claim 1 wherein the atmosphere from which the film is deposited is created by a process selected from the group consisting of electron beam evaporation, sputtering, and chemical vapor deposition.

8. A method in accordance with claim 7 wherein the selected process is chemical vapor deposition.

9. A method in accordance with claim 1 wherein the clean glass panel is formed by drawing a continuous sheet of glass from a body of molten glass, and the film is deposited on the glass sheet as it is being drawn, or immediately thereafter.

10. A method of producing a glass panel for a LCD device wherein the glass is nominally free of alkali metal oxides, that is, has no intentionally added alkali metal compound in its batch, but contains up to about 0.1% by weight $Na^+$ as an impurity, and wherein the method comprises exposing a clean glass panel, during or immediately following its formation, to an atmosphere of an atomized or ionized inert refractory material, or reactive precursor, to deposit on at least one surface of the clean glass panel a continuous, permanent barrier layer film that is transparent and that is greater than 50 nm, but not over 500 nm, in thickness, cleaning and stacking a plurality of such coated glass panels to form a stack of adjacent panels in which the total film thickness between each pair of adjacent panels in the stack is greater than 100 nm, and heat treating the stack to compact the glass; the permanent barrier layer film on the clean glass panel functioning both as a barrier to sodium ion migration from the glass and as a parting agent during the compacting heat treatment.

11. A method of compacting a plurality of clean glass panels in a stack wherein the glass is nominally free of alkali metal oxides, that is, has no intentionally added alkali metal compound in its batch, but contains up to 0.1% by weight $Na^+$ as an impurity, and wherein a surface on each glass panel opposes a surface on an adjacent glass panel, the method comprising depositing on at least one surface of each clean glass panel a continuous, permanent, and transparent barrier layer film from an atmosphere of an atomized or ionized inert refractory material, or reactive precursor, the film being greater than 50 nm, but not over 500 nm, in thickness, stacking the filmed panels so that at least one of each pair of adjacent surfaces has a film, and the total film thickness between each pair of adjacent surfaces is greater than 100 nm and subjecting the stack to a compaction thermal cycle, the permanent barrier layer film on the clean glass panel functioning both as a barrier to sodium ion migration from the glass and as a parting agent during the compaction thermal cycle.

12. A method in accordance with claim 11 wherein the film is deposited on both the top and bottom surfaces of each panel.

13. A method in accordance with claim 12 wherein the film is deposited in a thickness of not over about 100 nm.

14. A method in accordance with claim 11 wherein the deposited barrier layer film in silica.

* * * * *